C. MINK.
FRUIT STONER.
APPLICATION FILED MAR. 3, 1919.
1,305,395.
Patented June 3, 1919.
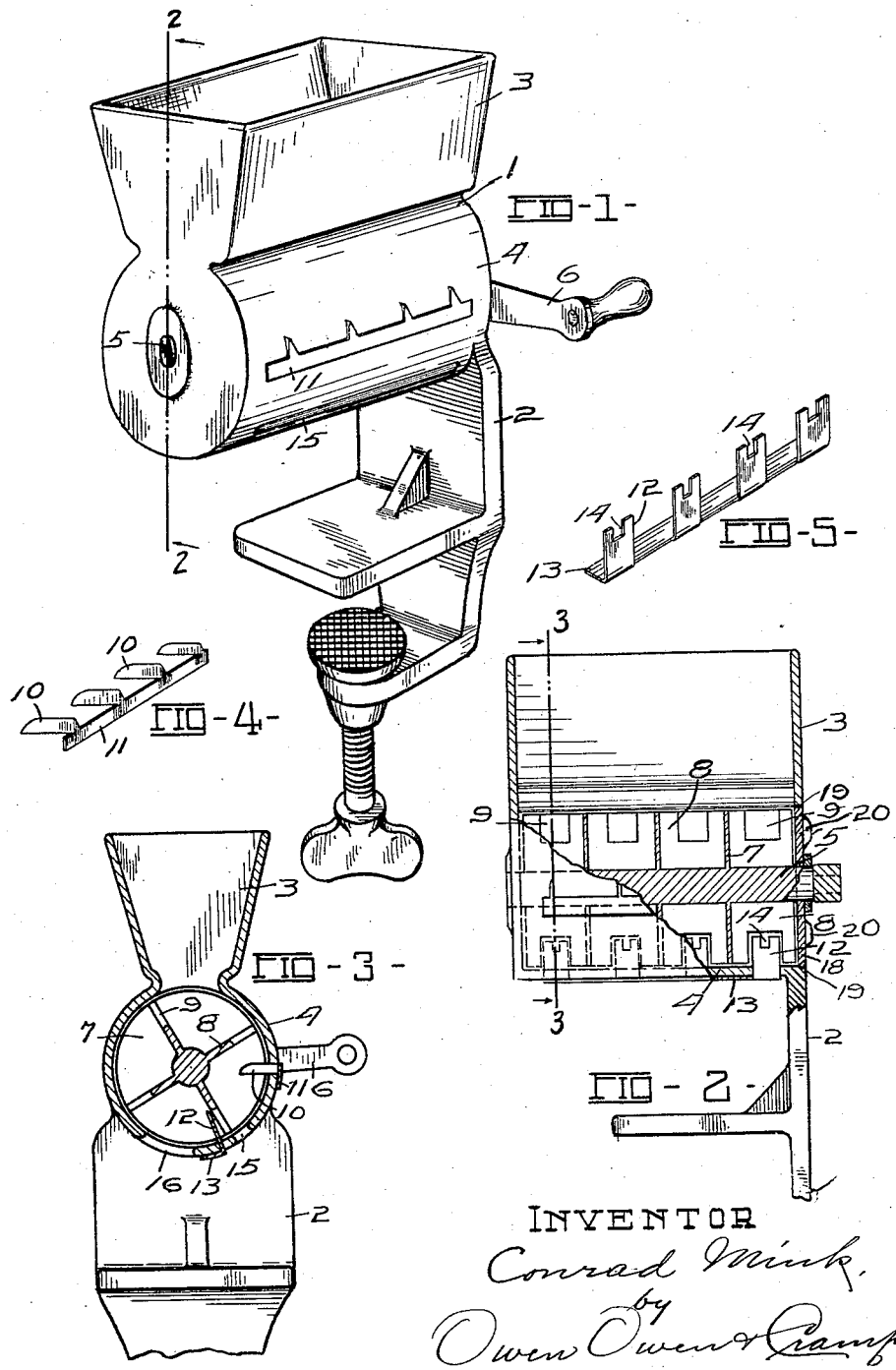
INVENTOR
Conrad Mink.
by
Owen Owen & Crampton

UNITED STATES PATENT OFFICE.

CONRAD MINK, OF HOLGATE, OHIO.

FRUIT-STONER.

1,305,395.  Specification of Letters Patent.  Patented June 3, 1919.

Application filed March 3, 1919.  Serial No. 280,280.

*To all whom it may concern:*

Be it known that I, CONRAD MINK, a citizen of the United States, and a resident of Holgate, in the county of Henry and State of Ohio, have invented a certain new and useful Fruit-Stoner; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention particularly relates to a means for pitting cherries, without lacerating the flesh or pulp. It particularly has for its object to provide a means whereby the cherry will be cut open and then rolled to a position such that the stone or pit may be extracted from the cherry and ejected from the device embodying my invention. Means is also provided for the ejectment of the flesh or cherry body subsequent to the removal of the pit.

The invention may be contained in structures of different forms. For the purpose of illustrating a practical application of my invention, I have selected one of such structures and shall describe it hereinafter. The structure selected is illustrated in the accompanying drawings.

Figure 1 is a perspective view of the fruit stoner embodying my invention. Fig. 2 is a sectional view taken on the line 2—2 indicated in Fig. 1. Fig. 3 is a sectional view taken on line 3—3 indicated in Fig. 2. Fig. 4 illustrates a set of knives for opening the cherries. Fig. 5 illustrates the pit ejecting lips.

1, Fig. 1, is the shell or case of the fruit stoner, selected for purpose of illustration. It may be supported by the bracket 2. It has the shell part 3 in which the cherries may be inserted and a cylindrical part 4, in which the operation of extraction is performed. A shaft 5, extends through the cylindrical part 4 of the shell and may be rotated by the crank 6. A plurality of flanges or disks 7, is secured to the shaft 5. The spaces between the flanges 7 and between the outer flanges and the ends of the cylindrical part 4 of the shell are partitioned by radially extending partitions 8 that divide the annular chambers formed by the flanges 7 and the walls of cylindrical portion 4 and the shaft 5 into compartments which are of a size sufficient to receive only a single cherry in each compartment.

The partitions 8, are provided with recesses 9, located in their outer edges. A plurality of knives, 10, extend from the cylindrical wall of the cylindrical portion 4, into the spaces between the flanges 7, and will extend into the recesses 9, when the partitions 8 pass the knives upon rotation of the shaft 5. The knives 10, may be struck up from the strip 11, and the strip 11 may be secured to the outside of the cylindrical portion 4 by any suitable means such as by spot welding or otherwise. When the cherries are carried by the partitions 8 downward from the hopper part 3, the cherries will be cut by the knives 10 along one side thereof, and at the same time the cherries will be rolled on the cylindrical wall of the cylindrical portion 4 and also rolled by reason of the resistance to the cutting action of the knives, until the end of the cut portion which was first to be cut, has been caught by the pit extractors. The pit extractors consist of a plurality of lips 12, that may be struck up from the strip 13, which is secured to the underside of the cylindrical portion 4, by any suitable means such as by spot welding or otherwise. The lips 12 may also be provided with recesses 14, which allows the escape of considerable pulp and forms finger-like projections on each side thereof in the lips 12. The recesses 14 are too small, however, to permit the pits to pass through. As the cherries roll the cut portion is penetrated by the lips 12, although the lips extend at right angles to the direction of the cuts in the cherries. They, however, penetrate in advance of the pit and the recesses force the pulp by the lips 12, while the pits are engaged by the lips 12. The wall of the cylindrical portion 4 is provided with an opening or slot 15, through which the pits fall. The slot 15 is too small to allow the escape of cherries. The cylindrical portion 4 is also provided with an opening 16 which is located back of the lips 12, which, however, is large enough to allow the cherries to escape after the pit has been removed.

By rotating the crank 6, the cherries will be carried down in the several compartments formed about the shaft 5, and the pits will be extracted and will pass through the opening 15, while the flesh or the bodies of the cherries will pass through the opening 16, The cylinder portion 4 may be closed at one end by the removable cover 18 provided with the threads 19. The shaft and the parts connected thereto may be removed by rotation of the cover. The cover 18 may be provided with the finger engaging lugs or projections 20.

I claim—

1. In a fruit stoner, a rotatable member having a plurality of compartments, the walls of the compartments having recesses, a plurality of knives extending into the compartments and a plurality of extracting lips extending into the compartments, the knives and the lips located in the line of rotation of the recesses.

2. In a fruit stoner a rotatable member having a plurality of compartments each compartment for receiving a single fruit the walls of the compartments having recesses, a plurality of knives extending into the compartments and a plurality of extracting lips having extracting fingers extending into the compartments, the knives and the lips located in the lines of movement of the recesses and the knives located at such a position relative to the lips that the fruit will be rotated to position the cut portion outward from the rotatable member.

3. In a fruit stoner, a rotatable member having a plurality of compartments each compartment for receiving a single fruit, the walls of the compartment having recesses, a plurality of knives extending into the compartments, a plurality of extracting lips having extracting fingers extending into the compartments, the knives and the lips located in the lines of movement of the recesses and the knives located at such a position relative to the lips that the fruit will be rotated to position the cut portion outward from the rotatable member, and so that the extracting lips will penetrate one end of the cut in the fruit.

4. In a fruit stoner, a shell having a hopper and a cylindrical portion, a shaft located in the cylindrical portion and having a plurality of flanges forming annular chambers between the shaft and the walls of the cylindrical portion, partitions dividing the annular chambers into compartments, each compartment having a size sufficient to receive a single fruit, the partitions having recesses located in their outer edges, a plurality of knives extending into the cylindrical portion and at a point about 90 degrees from the hopper and in the path of movement of the fruit, a plurality of fruit extracting lips extending into the cylindrical portion and in the path of movement of the fruit and at a point about 90 degrees from the knives, the cylindrical portion having a slot for the ejectment of the stones and a slot for the ejectment of the flesh of the fruit.

In testimony whereof, I have hereunto signed my name to this specification.

CONRAD MINK.

Copies of this patent may be obtained for five cents each, by addressing the "Commissioner of Patents, Washington, D. C."